United States Patent [19]

Brown et al.

[11] Patent Number: 4,604,685
[45] Date of Patent: Aug. 5, 1986

[54] TWO STAGE SELECTION BASED ON TIME OF ARRIVAL AND PREDETERMINED PRIORITY IN A BUS PRIORITY RESOLVER

[75] Inventors: Richard P. Brown, Acton; Richard A. Lemay, Carlisle; G. Lewis Steiner, Milford; William E. Woods, Natick, all of Mass.

[73] Assignee: Honeywell Information Systems Inc., Waltham, Mass.

[21] Appl. No.: 659,012

[22] Filed: Oct. 9, 1984

Related U.S. Application Data

[63] Continuation of Ser. No. 350,537, Feb. 19, 1982, abandoned.

[51] Int. Cl.[4] ............................................. G06F 9/46
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,913,070 | 10/1975 | Malcolm et al. | 364/200 |
| 3,993,981 | 11/1976 | Cassarino, Jr. et al. | 364/200 |
| 4,001,783 | 1/1977 | Monahan et al. | 364/200 |
| 4,028,664 | 6/1977 | Monahan et al. | 364/200 |
| 4,030,075 | 6/1977 | Barlow | 364/200 |
| 4,152,761 | 5/1979 | Louie | 364/200 |
| 4,225,942 | 9/1980 | Kobs et al. | 364/900 |
| 4,271,467 | 6/1981 | Holtey | 364/200 |
| 4,291,371 | 9/1981 | Holtey | 364/200 |
| 4,314,335 | 2/1982 | Pezzi | 364/200 |

Primary Examiner—Thomas M. Heckler
Assistant Examiner—Daniel K. Dorsey
Attorney, Agent, or Firm—Nicholas Prasinos; John S. Solakian

[57] ABSTRACT

A priority resolver for providing unambiguous resolution of requests among competing processes vying for access to a common device and which is adapted to a non-distributed environment.

12 Claims, 3 Drawing Figures

SHEET 2 of 2

TWO STAGE SELECTION BASED ON TIME OF ARRIVAL AND PREDETERMINED PRIORITY IN A BUS PRIORITY RESOLVER

This is a continuation of Ser. No. 350,537, filed Feb. 19, 1982, now abandoned.

RELATED APPLICATIONS/PATENTS

The following U.S. Patent is incorporated herein by reference:

Data Processing System Having Distributed Priority Network invented by George T. Barlow and issued on June 14, 1977 as U.S. Pat. No. 4,030,075.

BACKGROUND OF THE INVENTION

1. Field of the Invention

This invention relates generally to minicomputing systems and particularly to a priority resolver mechanism for resolving conflicts between the minicomputing subsystems vying for access to a shared resource and more particularly to cache memory.

2. Description of Prior Art

The storage hierarchy concept is based on the phenomenon that programs under execution exhibit the behavior that in a given period of time a localized area of memory receives a very high frequency usage. Thus, a memory organization that provides a relatively small size buffer (cache memory) at the CPU interface and various levels of increasing capacity slower storage can provide an effective access time that lies somewhere in the range between the fastest and slowest elements of the hierarchy.

There are various means of communication between the various, subsystems and cache memory. In such communication, conflict may result and a priority resolving mechanism is necessary to resolve the conflict. There are a variety of priority resolvers in the prior art, one typical such priority mechanism being utilized in the system disclosed in U.S. Pat. No. 4,030,075 issued June 14, 1977 and entitled "Data Processing System Having Distributed Priority Network" incorporated herein by reference.

Generally, priority resolvers inherently have a metastable property resulting from the violation of set-up time, hold time and pulse width specifications which may result in failure to resolve in a predictable period of time. When these specified minimum times are violated, there can be exactly enough energy in the input signal to precisely balance the input and output voltages of the latching circuit. Less energy will not precisely balance the input and output voltages and will allow the latch to settle back into its original state. Likewise, more energy will cause the latch to achieve the new state. Therefore, an extremely small window of time exists which will cause a very long indeterminate state at the output. Recovery from this state is dependent upon available internal imbalanced charging currents and node capacitance. These parameters are both process dependent; therefore, recovery time of a particular part is both vendor and batch dependent. What is needed is an improved priority resolver that eliminates this timing uncertainty.

Typical U.S. patents, although not necessarily the closest prior art relating to priority resolving devices, are U.S. Pat. No. 3,993,981 entitled "Apparatus for Providing Data Transfer Requests in a Data Processing System"; U.S. Pat. No. 4,001,783 entitled "Priority Interrupt Mechanism"; U.S. Pat. No. 4,225,942 entitled "Daisy Chaining of Device Interrupts in a Cathode Ray Tube Device"; and U.S. Pat. No. 4,385,382 entitled "Communication Multiplexer Having a Variable Priority Scheme Using a Read Only Memory".

OBJECT OF THE INVENTION

It is an object of the invention to provide an improved priority resolver that seldom fails to resolve conflicts between computer subsystems vying for the same resource within a specified interval.

SUMMARY OF THE INVENTION

This and other objects of the invention are achieved according to one embodiment of the invention by overcoming the violation of pulse width specification which can occur due to asynchronism and providing an unambiguous resolution of requests among competing processes vying for access to a common device.

The invention comprises a logic network which is designed to receive and store requests of competing processes for service by a common device. Each request stored has a priority level assigned to it. The stored requests are compared and a decision is rendered as to which process (requestor) will receive the service requested. The storage of any request is represented by the setting of a flip-flop associated with that request. In order to ascertain that any given flip-flop stabilizes within a predetermined time, the network is designed to operate in combination with pretested flip-flops having the ability to stabilize within a predetermined time. The invention is designed to use parts which are known to recover relatively quickly in such an environment.

DESCRIPTION OF THE PREFERRED EMBODIMENTS

Figure 1:
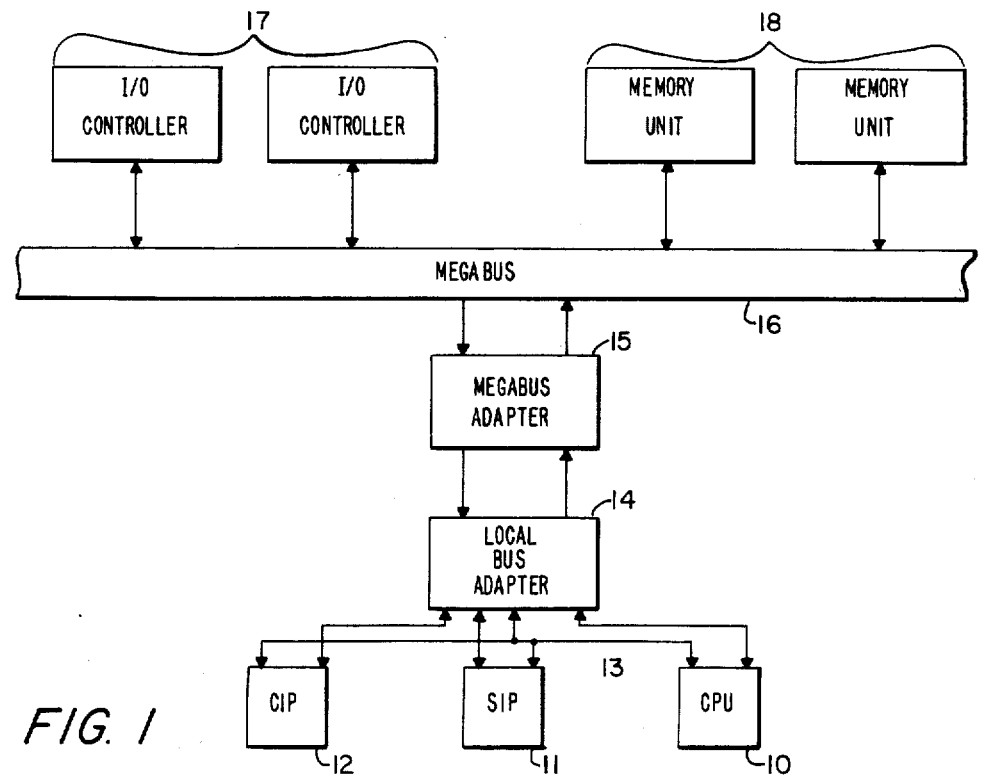
FIG. 1 shows in general block diagram format a data processing system which includes the invention.

Referring to FIG. 1, the data processing system includes a central processing unit (CPU) 10 and optional processors including a scientific instruction processor (SIP) 11 and a commercial instruction processor (CIP) 12. The CPU 10, SIP 11 and CIP 12 communicate by way of a local bus 13. The optional processors may be used to extend the range of the CPU 10 for special applications. Each of the processors further communicates by way of bidirectional communication links with a local bus adapter 14 which includes a memory management unit and a cache memory system. The cache memory system provides a buffer storage for those portions of main memory that are currently being used by the CPU 10, SIP 11, and CIP 12. The memory management unit provides for the translation of virtual memory addresses to physical memory addresses.

The local bus adapter also is in electrical communication with a megabus adapter 15 which provides an interface with an asynchronous communication bus referred to as the MEGABUS 16. The MEGABUS 16 is a common communication bus for accommodating a plurality of system devices including I/O controllers 17 and a main memory comprised of memory units 18.

The present invention resides in the local bus adapter 14. In referring to the Figures, it is to be understood that like reference numbers refer to the same logic devices.

Figure 2:
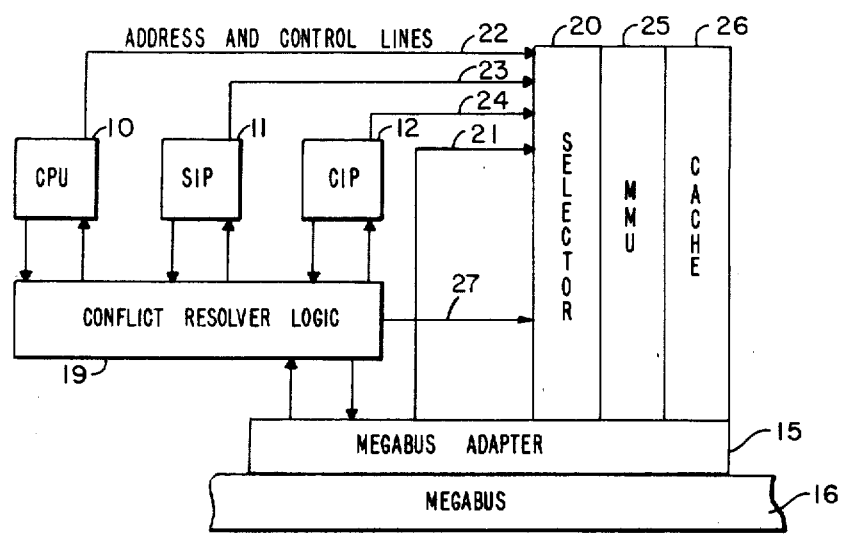
FIG. 2 shows a more detailed functional block diagram of the invention.

Referring to FIG. 2, a conflict resolver logic unit 19 is in electrical communication with the CPU 10, the SIP 11 and the CIP 12. The conflict resolver logic unit further is in electrical communication with the megabus adapter 15, and a selector logic unit 20.

The selector logic unit 20 receives select control signals from the conflict resolver logic unit 19 by way of control lines 27. In response to logic signals on control lines 27, the selector logic unit 20 selects one of four control busses 21–24 respectively leading from megabus adapter 15, CPU 10, SIP 11, and CIP 12. The information on the selected one of busses 21–24 is forwarded by the selector logic unit 20 to a memory management unit (MMU) 25. The MMU 25 controls three forms of access to a cache memory unit 26. The three forms of access are READ, WRITE, and EXECUTE. Access control is implemented on a segment basis, with each segment having an associated segment descriptor specifying the location of a segment in main memory. The segment descriptors typically are contained within the hardware of the MMU, so that descriptor tables in memory are not referred to during program execution. At system initialization, the descriptors are given values which create a transparent mode of execution to effect the translation of a virtual memory address into a physical memory address.

The function of the cache memory unit 26 is to provide a buffer storage for those portions of main memory that are currently being used by the processors.

In operation, the conflict resolver logic 19 receives access requests from one or more of the megabus adapter 15, CPU 10, SIP 11 and CIP 12. If a request is received during the time period when the local bus adapter 14 is not busy, then the requests are handled in accordance with the order of their arrival.

If a request is received after the local bus adapter 14 is busy, the request is temporarily denied. If multiple requests are received during a time period that the local bus adapter 14 is not busy, then a first request is received by way of example from CPU 10, and a flip-flop within the conflict resolver logic unit 19 stores that first request. Prior to a time period when such flip-flop becomes stable, there is a period of time during which a higher priority request may be received and honored after a lower priority request has been received. It is essential to the operation of the data processing system that any conflicts be resolved within a specifiable time period in order for designated data processing rates to be achieved. If request pulses are received by the conflict resolver logic unit 19 which are of a time separation less than that required to cause a receiving flip-flop to enter into a stable state, then the receiving flip-flops may enter into a metastable state in which the output of the flip-flop oscillates. The time period required by the conflict resolver logic unit 19 thereupon would be extended beyond commercially accepted time periods. A further problem in a prioritized request resolving system is the access time of a requestor. In the present invention as disclosed in the preferred embodiments described herein, request conflicts are resolved in a time period of shorter duration than that heretofore known, and the access time of requestors such as the CPU 10 is substantially reduced from that heretofore known.

In the operation of the system illustrated in FIG. 2, the megabus adapter 15 issues, by way of example, a cache memory access request to the logic unit 19 after the megabus adapter 15 has detected a memory write operation wherein any of the I/O controllers 17 of FIG. 1 have written into memory locations of the memory units 18.

Figure 3:
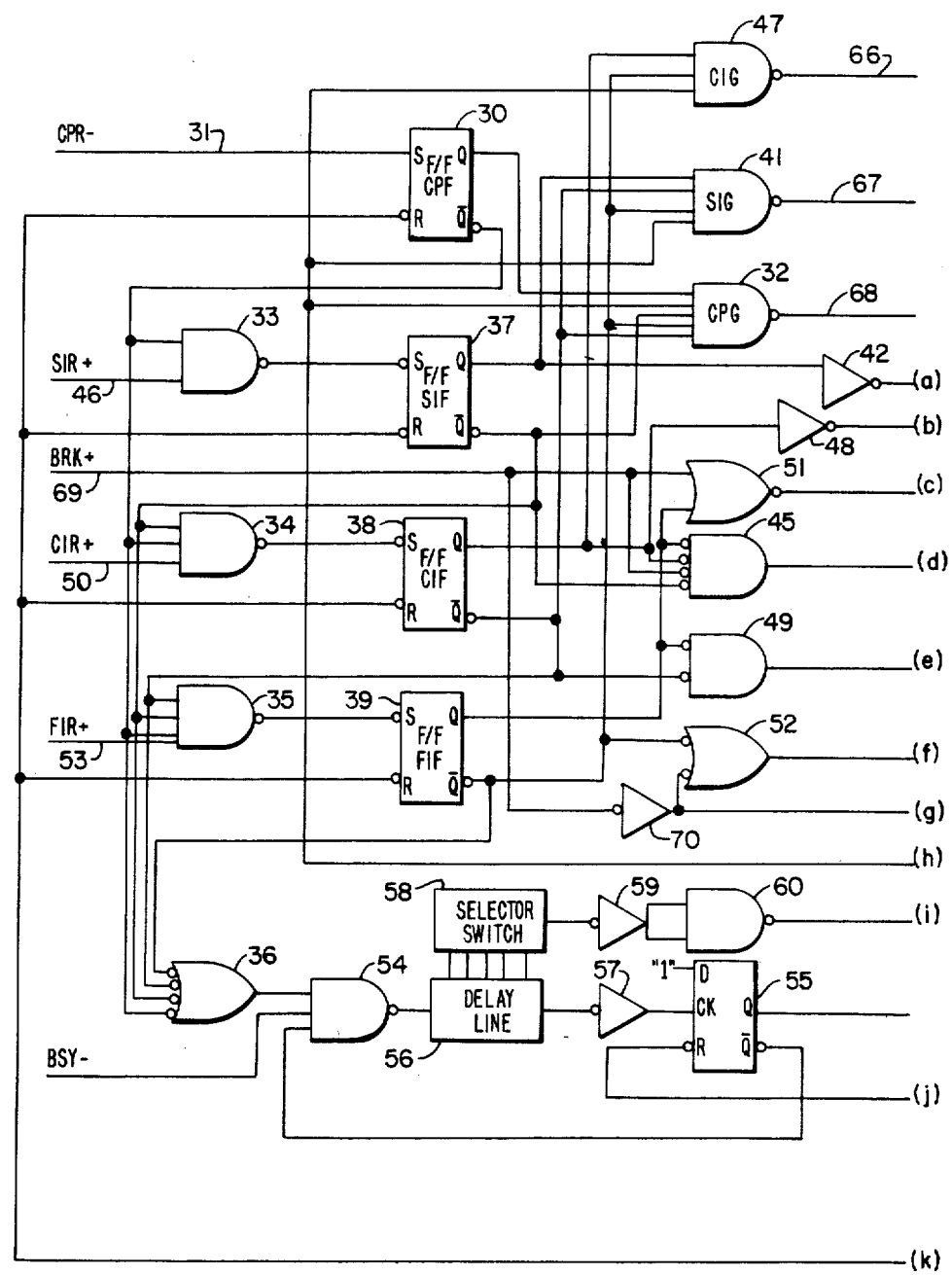
FIG. 3 is a detailed logic diagram of the invention.
Figure 3:
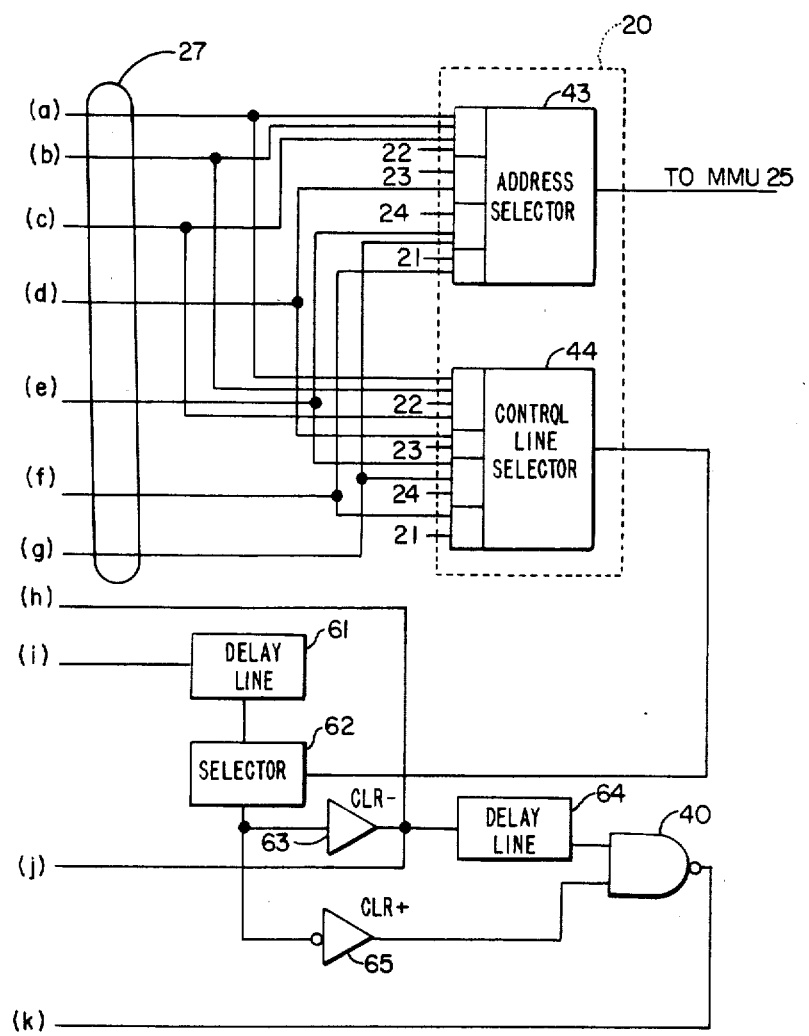

Referring to FIG. 3, a D-type flip-flop 30 receives an access request from the CPU 10 of FIG. 2 by way of a control line 31. The Q output of the flip-flop is connected to one input of a NAND gate 32. The Q complement output of the flip-flop is connected to one input of a NAND gate 33, to one input of a NAND gate 34, to one input of a NAND gate 35 and to one input of a NOR gate 36. The clear input of flip-flop 30 is connected to the clear input of a D-type flip-flop 37, to the clear input of a D-type flip-flop 38, to the clear input of a D-type flip-flop 39, and to the output of a NAND gate 40.

The Q output of flip-flop 37 is connected to one input of a NAND gate 41, and further is connected through an inverter 42 to one input of address selector logic unit 43 and to one input of control line selector logic unit 44. The Q complement output of the flip-flop 37 is connected to second inputs of each of gates 32, 34, 35 and 36, and to one input of a NAND gate 45. The S input of flip-flop 37 is connected to the output of gate 33, a second input of which is connected by way of a control line 46 to an output of the SIP 11 of FIG. 2.

The Q output of flip-flop 38 is connected to one input of a NAND gate 47, to a second input of gate 45, and by way of an inverter 48 to a second input of the address selector logic unit 43 and to a second input of the control line selector logic unit 44. The Q complement output of the flip-flop 38 is connected to a second input of gate 41, to a third input of gate 32, to one input of a NAND gate 49, and to a third input of gate 35. The S input of flip-flop 38 is connected to the output of gate 34, the third input of which is connected to a control line 50 leading to an output of the CIP 12 of FIG. 2.

The Q output of flip-flop 39 is connected to one input of a NOR gate 51, to a third input of gate 45, and to a second input of gate 49. The Q complement output of flip-flop 39 is connected to a second input of gate 47, to a third input of gate 41, to a fourth input of gate 32, to one input of a NOR gate 52, and to a fourth input of gate 36. The S input of flip-flop 39 is connected to the output of gate 35, a fourth input of which is connected by way of a control line 53 to an output of the megabus adapter 15 of FIG. 2.

The output of gate 36 is applied to one input of a NAND gate 54, a second input of which is connected to the Q complement output of a D-type flip-flop 55. The output of gate 54 is applied through a delay line 56 and an inverter 57 to the clock input of flip-flop 55.

The delay line 56 applies one of a plurality of delays to the logic signal received from gate 54 dependent upon the setting of selector switch unit 58. The switch unit 58 supplies the selected delay by way of an inverter 59 to two inputs of a NAND gate 60. The output of the gate 60 is applied through a delay line 61 to one set of inputs of a timing generator 62. A second set of inputs of the timing generator 62 is connected to the output of the control line selector logic unit 44.

The output of the timing generator 62 is applied through an inverter 63 to a third input of gate 47, to a fourth input of gate 41, to a fifth input of gate 32, and to the clear input of the flip-flop 55. The output of the inverter 63 also is applied through a delay line 64 to one input of gate 40. The output of the timing generator 62 further is applied through an inverter 65 to a second input of the gate 40.

Referring to the upper middle portion of FIG. 3, the output of gate 47 is applied to a control line 66 leading to an input of the CIP 12 of FIG. 2, the output of gate 41 is applied to a control line 67 leading to an input of the SIP 11 of FIG. 2, and the output of gate 32 is applied to a control line 68 leading to an input of the CPU 10 of FIG. 2.

A second input of the gate 51 is connected to a control line 69 leading from an output of the megabus adapter 15 of FIG. 2, and further is connected to a fourth input of gate 45, and by way of an inverter 70 to a second input of gate 52, to a third input of address selector logic unit 43, and to a third input of the control line selector logic unit 44. The output of gate 51 is connected to a fourth input of the address selector logic unit 43 and to a fourth input of the control line selector logic unit 44. The output of gate 45 is connected to a fifth input of the address selector logic unit 43 and to a fifth input of the control line selector logic unit 44. The output of gate 49 is connected to a sixth input of the address selector logic unit 43 and to a sixth input of the control line selector logic unit 44. The output of the gate 52 is connected to a seventh input of the address selector logic unit 43 and to a seventh input of the control line selector logic unit 44.

An eighth input of address selector logic unit 43 is connected to address lines 22 of FIG. 2. A ninth input of address selector logic unit 43 is connected to address lines 23 of FIG. 2. A tenth input of address selector logic unit 43 is connected to address lines 24 of FIG. 2. An eleventh input of address selector logic unit 43 is connected to address lines 21 of FIG. 2.

An eighth input of control line selector logic unit 44 is connected to control lines 22 of FIG. 2. A ninth input of control line selector logic unit 44 is connected to control lines 23 of FIG. 2. A tenth input of control line selector logic unit 44 is connected to control lines 24 of FIG. 2. An eleventh input of control line selector logic unit 44 is connected to control lines 21 of FIG. 2.

The output of the address selector logic unit 43 is the selected address sent to MMU 25 of FIG. 2.

In operation, a request from the CPU 10 of FIG. 2 is supplied via control line 31 to the S input of flip-flop 30. Requests may also be received on control line 46 from the SIP 11, on control line 50 from the CIP 12, and on control line 53 from the megabus adapter 15 of FIG. 2. As before stated, a CPU request is treated with lowest priority, an SIP request is accorded a next higher priority, and a CIP request is accorded a still higher priority. The highest priority is assigned to a request received from the megabus adapter 15 on control line 53.

In the event that the control signals on lines 31, 46, 50 and 53 exhibit less than minimum leading edge separations necessary for the proper operation of a corresponding one of the flip-flops 30, 37, 38 and 39, then the system of FIG. 3 could enter into what has been called a metastable state. More particularly, the Q output of a flip-flop may oscillate under such conditions rather than stabilize in either a logic zero or logic one state. Such oscillation would occur when the energy supplied by an input signal to the flip-flop is not large enough to cause the output of the flip-flop to reach a new logic state, but is too large for the output of the flip-flop to settle back into its original logic state. It has been found that a small window of time may exist during which such an input logic signal may be received to cause a long indeterminate state to be exhibited by a flip-flop output. It further has been found that susceptibility of a flip-flop to the metastable state is dependent upon process dependent parameters such as internal imbalanced charging currents and node capacitance. By testing each flip-flop, those flip-flops susceptible to metastable states may be discarded. The probability of a system recovering from a metastable state within an acceptable time period thereby may be significantly improved.

The flip-flops 30, 37, 38 and 39, selected as described above, and applied in the logic circuit illustrated in FIG. 3, may significantly improve the time required to resolve conflicts between multiple requests for access to the local bus 13, and thereby significantly decrease access delay.

Continuing with the description and operation of FIG. 3, when a request is received from the CPU 10 of FIG. 2 in the form of a negative-going pulse on control line 31, the pulse is applied to the set input of the flip-flop 30. The resulting occurrence of the corresponding logic zero state at the Q complement output of flip-flop 30 disables gates 33-35 to prevent the servicing of any subsequent request from the SIP 11, CIP 12, or megabus adapter 15. The Q output of the flip-flop 30 further is applied through gate 32 to control line 68 to indicate to the CPU 10 that the request is being honored.

If, after the Q output of flip-flop 30 indicates that a request has been received from the CPU 10, a request from the SIP 11 is received on control line 46, the request from the SIP would be ignored because the Q complement output of the flip-flop 30 has disabled gate 33. Similarly, no subsequent requests from the CIP 12 or the megabus adapter 15 would be honored because the Q complement output of the flip-flop 30 has also disabled gates 34 and 35. However, if requests from higher priority requestors are received during the reaction period of conflict resolver logic unit 19, then both the lower priority first requestor flip-flop and higher priority requestor flip-flops could be activated. The sum of the propagation time exhibited by each of the gates 33-35 and the propagation time exhibited by the associated one of flip-flops 30, 37-39 thus defines a window within which a higher priority request may supersede a first occurring low priority request. If a higher priority request is received after the time period defined by such propagation window, the lower priority request shall prevail.

The outputs of the flip-flops 30, 37-39 are sensed by the gates 32, 41 and 47 to select the highest priority one of the requests detected from the CPU 10, SIP 11, CIP 12, and megabus adapter 15. If only a CPU request is detected, the output of gate 32 would transition to a logic zero level to indicate to the CPU that its request is being honored. The outputs of gates 41 and 47 in this event would be at a logic one level. If both a CPU and an SIP request are detected, the output of gate 41 shall transition to a logic zero level to indicate to the SIP 11 that its request is being honored. The outputs of gates 32 and 47 in this event shall be at a logic one level. If a CIP request is detected in combination with either or both of a CPU request and an SIP request, then in accordance with the previously described priority the output of gate 47 shall transition to a logic zero level while the outputs of gates 32 and 41 shall be at a logic one level. If a megabus adapter request is detected in combination with any or all of the other requests, then the Q output of flip-flop 39 shall be at a logic one level to indicate that the megabus adapter request is being honored, while the output of gates 32, 41, and 47 shall be at a logic one level.

The outputs of the flip-flops 30, 37-39 and control line 69 also are sensed by inverters 42, 48, and 70, and gates 51, 45, 49 and 52 which control the address selector logic unit 43 to select one of busses 21-24 of FIG. 2 in accordance with the previously described priority scheme. More particularly, the outputs of inverters 42 and 48 and the output of OR gate 51 are sensed by the address selector logic unit 43. If an all logic one pattern is detected indicating that the CPU 10 has acquired the local bus cycle, the address selector logic unit 43 selects the CPU address 22 for transmission to the MMU 25 of FIG. 2. In like manner, the SIP 11 acquires the local bus cycle if the output of gate 45 supplies a logic one to the address selector logic unit 43; the CIP 12 acquires the local bus cycle if the output of gate 49 supplies a logic one to the address selector logic unit 43.

The gate 36 senses the outputs of flip-flops 30, 37-39 to detect a request for a local bus cycle. When a request is detected, gate 36 enables gate 54 to initiate a timing chain to generate a pulse at the Q output of flip-flop 55 to control the timing of the cache memory unit 26 of FIG. 2, and to generate a clear pulse at the output of gate 40 to clear the logic system of FIG. 3 for further request conflict resolutions.

The output of inverters 42, 48, and 70, and gates 45, 49, 51, and 52 also are sensed by the control line selector 44 to cause selector 62 to select one of plural delay taps of delay line 61.

The timing chain comprised of gates 36 and 54, delay line 56, inverter 57 and flip-flop 55 generates a cache timing pulse at the Q output of flip-flop 55. The pulse is delayed by delay line 56 a time period sufficient to ensure that transients in the logic system of FIG. 3 have dissipated.

The timing chain comprised of gate 54, delay line 56, selector switch 58, inverter 59, gate 60, delay line 61, selector 62, amplifier 63, inverter 65, delay line 64 and gate 40 generates a cache cycle end pulse. The pulse is generated at the output of selector 62 and shaped by the circuit comprised of amplifier 63, inverter 65, delay line 64 and gate 40.

While the invention has been particularly shown and described with reference to preferred embodiments thereof, it will be understood by those skilled in the art that the foregoing and other changes in form and details may be made therein without departing from the spirit and scope of the invention.

Having described the invention, what is claimed as new and novel and for which it is desired to secure Letters Patent is:

1. In combination with a computer system having a common shared unit and further having a plurality of devices coupled to the common shared unit, each device having an assigned priority for accessing the common shared unit, each device competing with each other for access to said shared unit, a priority resolver for providing unambiguous resolution of requests by the devices for access to the shared unit during a first service cycle, said priority resolver comprising:

(a) first means including a plurality of storage elements, each having first and second states for storing a request received from one of said devices for access to said shared unit, all storage elements being connected to receive in parallel all requests from said plurality of devices in a predetermined common time period;

(b) second means coupled to said first means for determining priority access to the common shared unit based upon time of arrival of the request wherein state changes of higher priority storage elements are disabled with prior receipt of a request by any lower priority storage element;

(c) third means coupled to said first means for determining priority access to the common shared unit based on the assigned priority of the device making a request for access to the common shared unit by comparing priority of the stored requests and providing an output indicative of the highest priority request stored in one of the storage elements;

(d) fourth means coupled to said third means for selecting the highest priority device indicated by the output of the third means for communication with the shared unit; and (e) fifth means for resetting the first means to terminate a conflict resolver interval with each selection of a device, whereby one device is serviced per priority interval and a highest priority device will never have to wait more than one service cycle to gain access to the shared unit.

2. The computer system as recited in claim 1 including sixth means coupled to said second means for delaying the initiation of the first service cycle until the unambiguous resolution of the priority of the requests has been completed.

3. The computer system as recited in claim 2 including seventh means coupled to said sixth means for beginning the first service cycle.

4. The computer system as recited in claim 3 wherein different types of service may be requested to said shared unit by said devices and further involving eighth means coupled to said shared unit and to said devices for selecting the type of service requested by the selected requestor device.

5. The computer system recited in claim 4 wherein there are other types of cycles in addition to the first service cycle and including ninth means for providing timing pulses for each type of cycle.

6. The apparatus as recited in claim 1 wherein said first means comprise flip-flops.

7. The apparatus as recited in claim 1 wherein the second means comprise NAND gates responsive to the states of the storage elements.

8. In combination with a computer system having at least a central processing unit (CPU), a main memory coupled to said CPU, a common device in said CPU, and peripheral devices in a distributed environment coupled to said common device and main memory each device competing with each other for access to said common device said CPU, main memory, and peripheral devices having a preassigned priority for accessing said common device, a priority resolver distributed among said peripheral devices and main memory for providing unambiguous resolution of requests by the peripheral devices and main memory for access to the common device during a first service cycle said priority resolver comprising:

(a) first means including a plurality of storage elements, each storage element having first and second states for storing a request from one of said peripheral devices and main memory for access to said common device, all storage elements being connected to receive in parallel all requests from said CPU, main memory and peripheral devices in a predetermined common time period;

(b) second means coupled to said first means for determining access to the common device based upon time of arrival of the request with a first arrival gaining access to the common device by disabling higher priority storage elements and preventing receipt of a higher priority request;

(c) third means coupled to said first means for determining priority access to the common shared device based on the basis of assigned priority of the device making a request for access to the common unit by comparing priority of the stored requests and providing an output indicative of the highest priority request stored in one of the storage elements;

(d) fourth means coupled to said third means for selecting the highest priority device indicated by the output of the third means for communication with the shared unit; and (e) fifth means for resetting the first means to terminate a conflict resolver interval with each selection of a device;

whereby one device is serviced per priority interval and whereby a highest priority device will never have to wait more than one service cycle to gain access to the shared device.

9. The computer system as recited in claim 8 including sixth means coupled to the common device and main memories and to said fourth means for delaying the initiation of the first service cycle until the unambiguous resolution of the priority of the requests has been completed.

10. The computer system as recited in claim 9 including seventh means coupled to said common device and said first, second, third and fourth means for beginning the first service cycle.

11. The computer system as recited in claim 10 wherein different types of service may be requested to said common device by said peripheral devices or main memory and further involving eighth means coupled to said common device and to said peripheral devices for selecting the type of service requested by the selected requestor peripheral.

12. The computer system recited in claim 11 wherein there are other types of cycles in addition to the first service cycle and including ninth means for providing priority timing pulses for each type of cycle.

* * * * *